United States Patent
Henry et al.

(10) Patent No.: US 6,898,666 B1
(45) Date of Patent: May 24, 2005

(54) MULTIPLE MEMORY SYSTEM SUPPORT THROUGH SEGMENT ASSIGNMENT

(75) Inventors: Russell J. Henry, Wichita, KS (US); Max L. Johnson, Wichita, KS (US); Bret Weber, Wichita, KS (US); Dennis E. Gates, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 625 days.

(21) Appl. No.: 10/004,208

(22) Filed: Nov. 1, 2001

(51) Int. Cl.[7] .............................................. G06F 12/00
(52) U.S. Cl. ....................... 711/114; 711/141; 711/203
(58) Field of Search ............................... 711/114, 141, 711/203

(56) References Cited

U.S. PATENT DOCUMENTS

| 5,297,258 A | * | 3/1994 | Hale et al. .................. 711/114 |
| 6,138,125 A | * | 10/2000 | DeMoss ..................... 707/202 |
| 6,681,339 B2 | * | 1/2004 | McKean et al. ............... 714/5 |

* cited by examiner

*Primary Examiner*—Reba I. Elmore
(74) *Attorney, Agent, or Firm*—Suiter West PC LLO

(57) ABSTRACT

A method of increasing computer system bandwidth for computer system having two or more memory complexes is disclosed in which exclusive OR operations are performed on the data from the data regions to generate parity information which is stored in the same single cache pool as the data regions. By using a single cache pool for related data regions, bandwidth and performance are improved.

30 Claims, 4 Drawing Sheets

Four Data Regions with One Parity Region

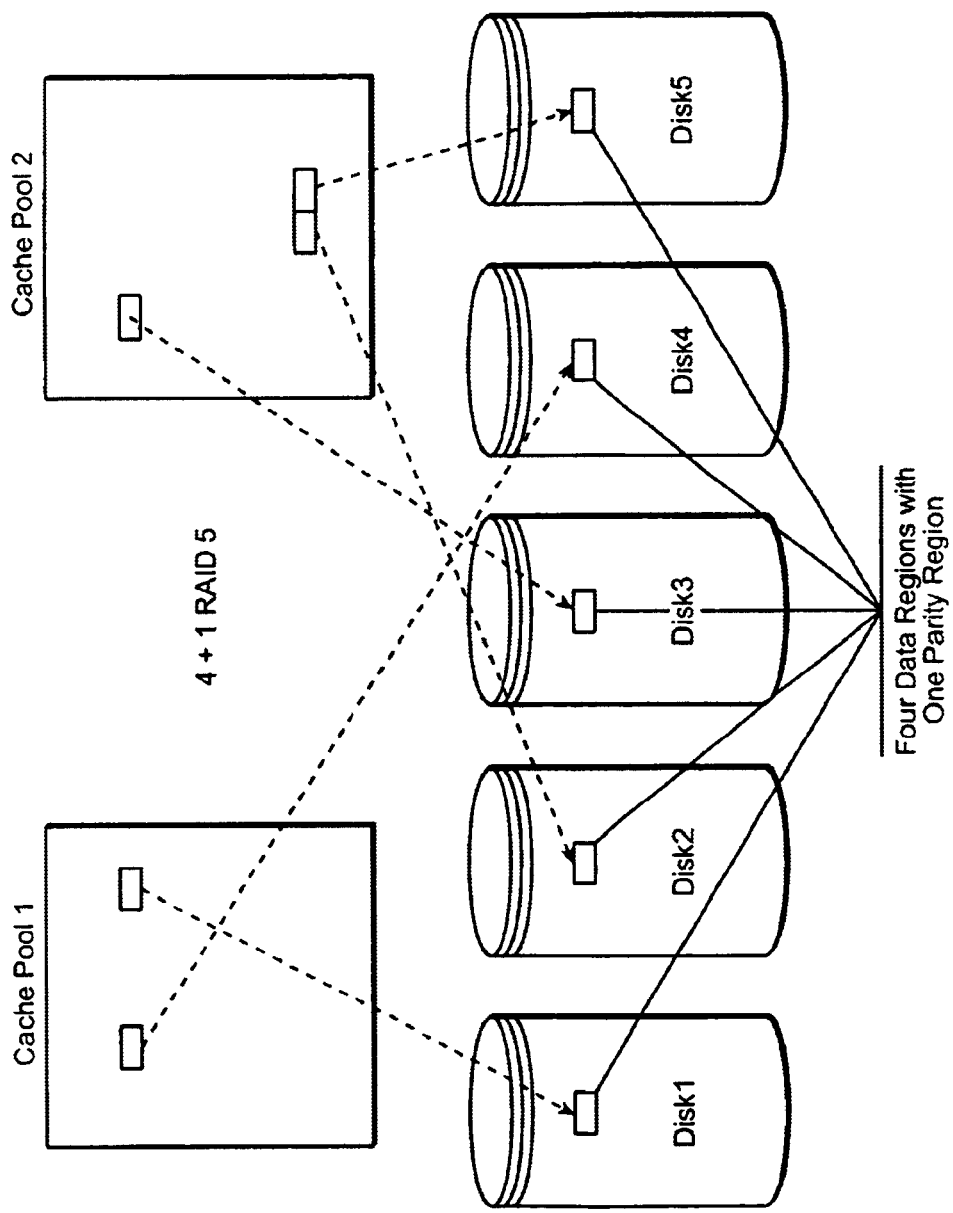
FIG._1
*(PRIOR ART)*

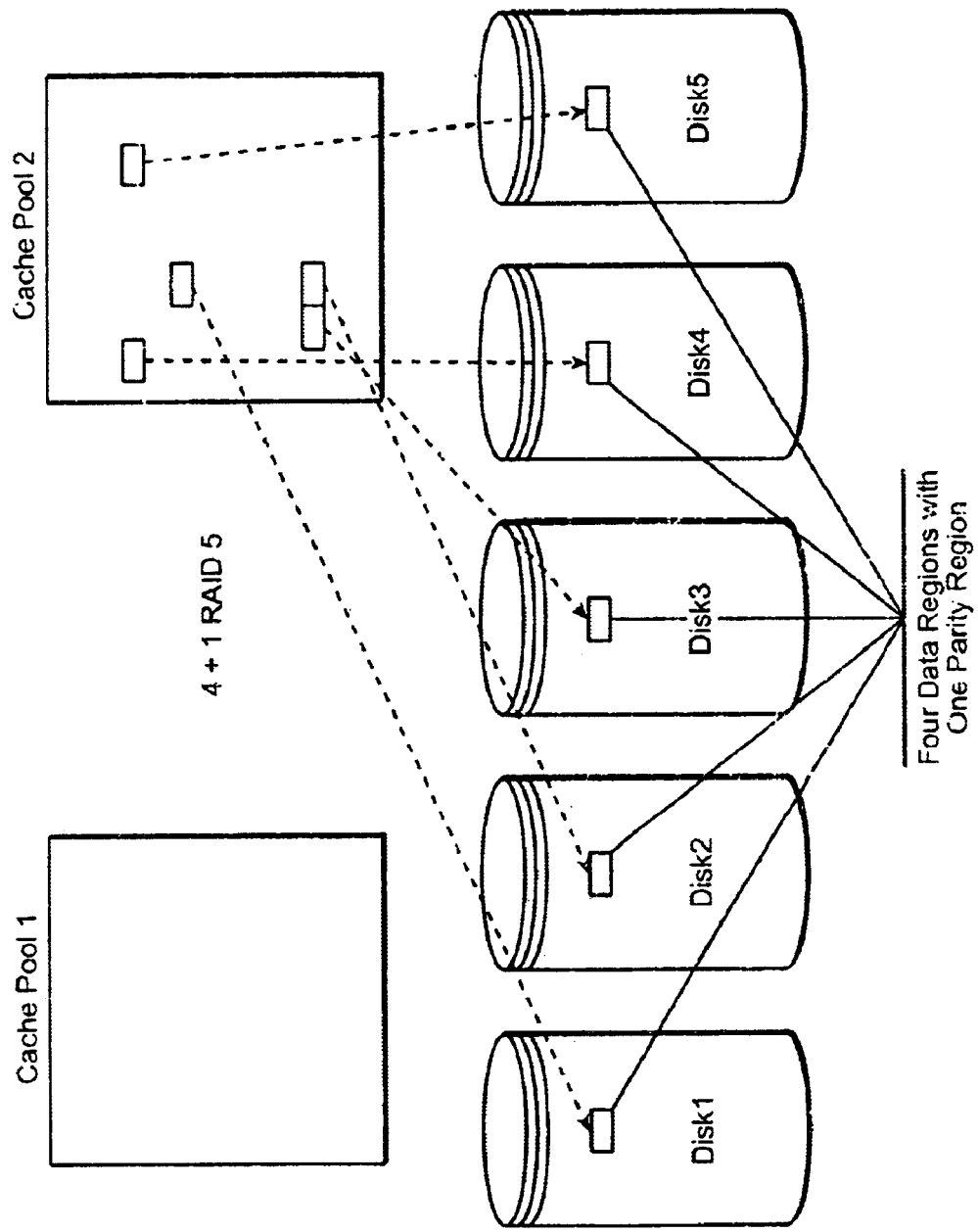
FIG._2

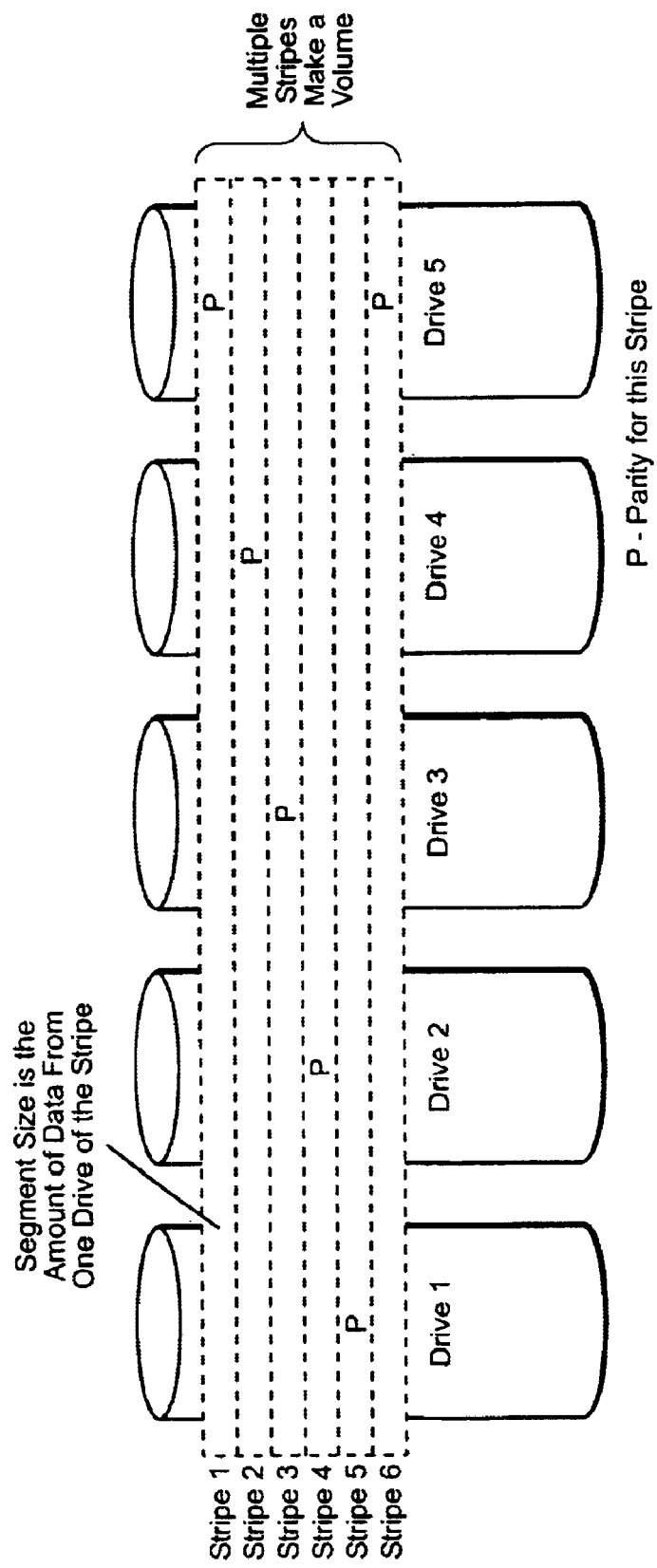
FIG._3

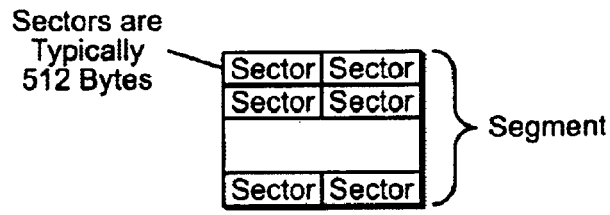
FIG._4
| LBA Range | Cache Pool | | |
|---|---|---|---|
| | 1 | 2 | 3 |
| 0 - 255 | X | | |
| 256 - 511 | | X | |
| 512 - 767 | | | X |
| 768 - 1023 | X | | |
| 1024 - 1279 | | X | |
| 1280 - 1535 | | | X |
| ... | | | |
FIG._5
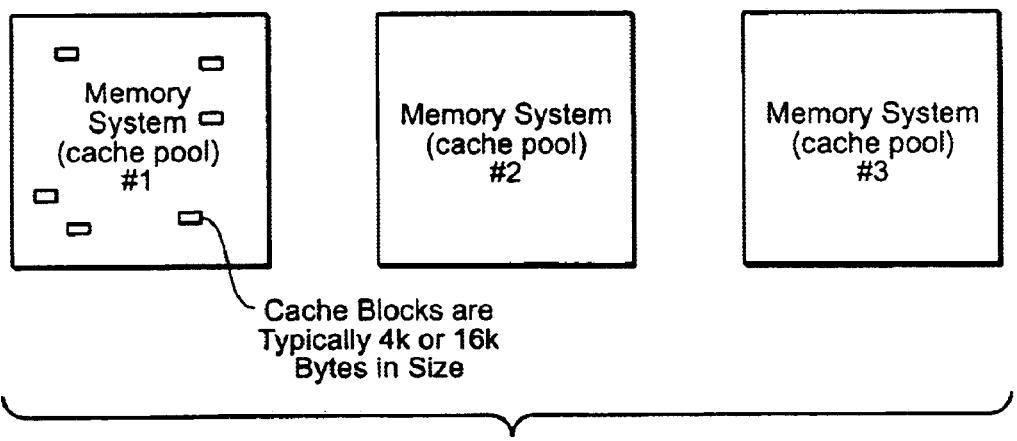
FIG._6

MULTIPLE MEMORY SYSTEM SUPPORT THROUGH SEGMENT ASSIGNMENT

FIELD OF THE INVENTION

The present invention generally relates to the field of computer data storage, and particularly to a method for increasing bandwidth in a multiple memory system.

BACKGROUND OF THE INVENTION

An established technology that provides large disk capacity with very high reliability is a redundant array of independent disk drives or RAID, also known as disk drive array technology. RAID uses multiple physically separate disk drives which act as a single drive and are all accessed through a single array controller. For data reliability, a parity block is derived from related data blocks of the various disk drives, permitting the rebuilding of data from one disk drive that fails by processing the data of the other drives along with the parity block. Data may be stored as a sector, a segment, a stripe, or a volume across the disk drives of a RAID system. This enables allows parallel read/writes by the disk drives and thereby increases data transfer speed.

In the disk array prior art, cache memory resides within a single contiguous memory. As I/Os are scheduled into this memory, hardware state machines perform exclusive-or (XOR) operations on the data to generate a parity block, and deposit the result in a pre-specified area of the contiguous memory. This causes basic problems of absolute memory system size due to design restrictions on the individual memory system, as well as limits of DRAM technology. It also creates issues of bandwidth, since overall bandwidth is limited by the memory size. If multiple memory complexes are used, cache block allocation across the memory systems causes XOR operations to cross the memory complexes, and creates inefficient transfers that decrease performance. In addition, bandwidth is also restricted due to the fact that I/O operations can be concentrated in one or two areas of the memory.

A memory system may include two or more memory complexes. A memory complex in a disk array controller contains cache memory and associated hardware for direct memory access (DMA) and exclusive OR operations (XOR). The cache memory is sometimes referred to as a cache pool. If multiple cache pools are used, the XOR operation could be performed on the data no matter where it existed; however, this makes the hardware that performs the XOR very complex and expensive.

FIG. 1 illustrates a prior art arrangement in which multiple cache pools divided up a single data set.

Therefore, it would be desirable to provide a method for maintaining related data within a single memory complex so as to avoid thrashing and enhance speed of operation.

SUMMARY OF THE INVENTION

Accordingly, the present invention is directed to a method of increasing computer system bandwidth for computer system having two or more memory systems.

To reduce cost and complexity, the XOR hardware may be designed to perform XOR operations on its cache pool only. The present method guarantees these data blocks reside in the same cache pool. Assignment of data regions to cache pools are made to ensure all access to any piece of data always uses the same cache pool. As long as all data needed for any one XOR operation is assigned to the same cache pool, no XOR operation is split between cache pools, thereby utilizing the memory complexes efficiently.

In a first aspect of the present invention, a method of increasing computer system bandwidth for computer system having two or more memory complexes is disclosed in which data regions from the two or more memory systems are assigned to a single cache pool. Exclusive OR operations are performed on the data from the data regions to generate parity information. The parity information is also stored in the same single cache pool as the data regions.

In a second aspect of the present invention, a computer memory system has two or more separate memory devices and a memory controller, wherein the memory controller assigns data regions from the two or more separate memory devices to a single cache memory pool.

The present invention provides a method of managing data in a multiple memory system to minimize disk thrashing and maximize data bandwidth.

The present invention provides dynamic management of data by allowing variation in the size of the data units and resulting cache pool.

This invention identifies a method to guarantee that common XOR cache blocks reside in the same memory complex, thereby eliminating thrashing between memory complexes.

This invention increases bandwidth by guaranteeing that the data is spread equally throughout the separate memory systems, even when the data accesses are limited to a single logical unit number (LUN).

When this is coupled with a switched architecture connecting the memory complexes, the result is potentially infinite scaling system bandwidth, independent of is LUN access patterns.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates the prior art method where multiple cache pools are used with a data set;

FIG. 2 illustrates the present invention in which a single cache pool is used in a multiple memory system;

FIG. 3 illustrates a 4+1 RAID embodiment of the present invention in which only one memory system contains the parity block;

FIG. 4 illustrates a segment composed of multiple sectors;

FIG. 5 illustrates a cache pool logical block addressing scheme; and

FIG. 6 illustrates multiple cache pools.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown.

Current mass data storage systems provide ever increasing storage capacities to satisfy user needs from host computer system applications. With the reliance on large capacity mass storage comes a requirement for improved reliability. To increase capacity and reliability, redundant arrays of independent disks (RAID) are used. A RAID consists of multiple storage units arranged in a redundant fashion to provide data integrity in the event of device failure are used. Recovery from many failures is performed within the memory storage system itself by data redundancy, error codes, and redundant storage units activated in case of device failure.

Under the control of a drive array controller, sector interleaving or striping is used to increase the data bandwidth. Sector interleaving is basic to the redundancy algorithm. As each block of data is being written to the data drives in the array, microcode generates the byte by byte XOR across all bytes of the interleaved data sectors. The parity bytes are all combined into one parity sector and written onto the parity drive.

The parity sector is written onto the parity drive as soon as possible after the writes to the data drives. The performance overhead is simply the time required to generate the XOR of the data bytes, and the time to send the write data to the parity drive. In the case of a write of a number of sectors which does not divide evenly into the number of data drives, there is an additional overhead to read the other sectors in the same stripe, to perform a read modify write cycle to get the parity byte correct. This is not a major concern as the majority of disk operations are reads.

RAID storage subsystems utilize a disk array controller that automates managing the redundant array, making operation transparent to the user. The controller makes the system appear to the host computer as a single, highly reliable, high capacity disk drive. In reality, the RAID controller distributes data across multiple small independent drives with redundancy and error checking information to improve reliability. Frequently RAID has large cache memory structures to further improve the performance of the RAID. The cache memory is associated with the disk array controller so that the storage blocks on the disk array are mapped to blocks in the cache memory. The host system simply requests blocks of data to be read or written and the RAID disk array controller processes the disk array and cache memory as directed.

There are several levels associated with RAID. RAID Level 0 requires a minimum of 2 drives to implement and implements a striped disk array in which the data is broken down into blocks and each block is written to a separate disk drive and no parity calculation overhead is involved. A RAID level 1 system has one or more disks for storing data and an equal number of additional mirror disks for storing copies of the information written to the data disks. Other RAID levels segment the data into portions for storage across several data disks. RAID levels 2–5 that utilize XOR parity to provide requisite redundancy. One of more additional disks are utilized to store error check or parity information. Striping improves overall performance by using concurrency to reduce the wait time involved in larger I/O operations in that several drives simultaneously process an I/O request. RAID level 5 uses striping as part of internal management functions. RAID level 7 has asynchronous, independently controlled and cached transfers, has a dedicated parity drive that can be on any channel, has an open system that uses standard SCSI drives, and a high speed internal cache data transfer bus. RAID level 1 may optionally include striping to improve its performance as compared to non-striped mirrored implementations. RAID level 10 requires a minimum of 4 drives to implement and is implemented as a striped array whose segments are RAID 1 arrays. RAID Level 53 requires a minimum of 5 drives and is similar to RAID level 3 because it is implemented as a striped RAID level 0 array whose segments are RAID 3 arrays. RAID Level 0+1 requires a minimum of 4 drives to implement RAID 0+1 is implemented as a mirrored array whose segments are RAID 0 arrays and has high I/O rates because of multiple stripe segments.

RAID storage subsystems manage data in units referred to as logical unit numbers or LUNs. A logic unit number is a 3-bit value (zero to seven) identifying a logical unit in a device. In the present invention, an LUN corresponds to an entire volume. A particular LUN is a subset of the storage space within the storage subsystem. A storage controller applies a particular RAID management arrangement to the data stored in that LUN. The Small Computer Systems Interface (SCSI) is a standard for connecting peripherals to a computer via a standard hardware interface, which uses standard SCSI commands. CDB refers to command descriptor blocks, blocks of SCSI information containing the command, parameter, and address information needed by the target to carry out a certain task.

Computer systems which process a large amount of data storage may spend a great deal of CPU and I/O bus time reading and writing data to and from memory systems. Reading from and writing data to and from disk drives greatly impacts and decreases performance and throughput of the computer systems. Thus, many computer systems include high speed, easily accessible, temporary cache memory to increase performance. When utilizing cache memory to temporarily hold data to be transferred, memory storage locations are removed from the main pool of memory storage locations in disk drives available to the data storage system in which data may be held pending use by the host.

To increase efficiency and bandwidth, XOR hardware is designed to perform XOR operations on its cache pool only. The method increases bandwidth by guaranteeing that the data is spread equally throughout the separate memory complexes, even when the data accesses are limited to a single LUN that, when coupled with a switched architecture connecting the memory subsystems, the result is potentially infinite scaling system bandwidth, independent of LUN access patterns. Data comes into the memory complexes from an outside source, such as a server. Related data from an I/O transfer ideally is temporarily stored in a single memory complex, although the data may be divided between memory complexes. The data in a single memory complex is then used to generate a parity block. The entire data plus the parity block is written to multiple drives. The memory complexes and the disk drives are logically separate. Therefore, the number of memory complexes may be scaled without affecting the disk drive number and vice versa.

The method by which data blocks are guaranteed to reside in the correct cache pool is accomplished by assignment. When a data transfer command is received by the disk controller a decision is made to provide blocks of cache memory for the data to reside is based on some assignment. This assignment may be from a disk sector size, the smallest granularity, because XOR operations happen on a disk sector size, to an entire volume which is the largest granularity. In simpler terms, Logical Block Addresses are assigned to specific cache pools based on the granularity chosen. In one embodiment, the I/O from the host computer has associated with it an LBA and an LUN to allow assignment by LBA or LUN.

Assignment of data regions to cache pools are made to ensure all access to any piece of data always uses the same cache pool. A software algorithm, implemented through a computer program of instruction code on the disk controller, or any appropriate mechanism, performs the assignment. As long as all data needed for any one XOR operation is assigned to the same cache pool no XOR operation is split between cache pools. This ensures simple and fast operation.

FIG. 2 shows a 4+1 RAID 5 implementation in which 4 data blocks are exclusive or'ed together to create a parity block. As in RAID 3 and RAID 4, RAID 5 data is striped at a block level across multiple parallel data disks. Unlike RAID 3 or 4, RAID 5 implements parity in a distributed fashion as opposed to using a fixed parity disk. That is, the data and parity information are arranged on the disk array so that they alternate between different disks. This distributed parity methodology removes the parity disk from being a potential bottleneck, as can happen in RAID 3 or RAID 4. As in RAID 4, a RAID 5 stripe depth is an integer multiple of (equal to or greater than) the virtual block size. All data the regions used are assigned to the same cache pool so that any access at any point in time to any region always uses the same cache pool.

FIG. 3 illustrates a 4+1 RAID 5 storage array. With striping, access times to the disk may be reduced and performance improved. Striping is a way of deploying RAID technology. The stripe size and chunk size may be set. Stripe set sizes define the width of a unit of data that can be allocated at a time. The chunk size also plays a role in defining the width of a unit of data, except that the chunk size is on a per-disk basis.

FIG. 4 illustrates a segment. The chosen segment size is 32K. Segment size is the amount of data from one drive of the stripe. A segment consists of logical blocks called disk sectors. Typically, sectors are 512 bytes.

The assignment granularity chosen for this embodiment is a stripe and utilizes three cache pools. Using a segment size of 32K, the total stripe size is the segment size times the number of drives used for data, in this case 4. So the stripe size is 32×4=128K. Addressed logical blocks inside a SCSI CDB are referring to sectors on the volume so the table can be generated for the example. Multiple stripes make up a volume.

FIG. 5 illustrates a table which assigns certain logical block addresses to certain cache pools. When an I/O is received, the LBA is determined to be in a certain range and that range determines which cache pool is used. No matter what the logical block size is, the assignment is performed in the same manner as it is based on the LBA number. When an I/O spans multiple LBA ranges, two XOR operations are required. The assignment shown in FIG. 5 is made on a rotational basis. Accessing different LBA ranges uses separate memory complexes which use separate paths resulting in load balancing on those paths.

FIG. 6 shows the three cache pools with all data from one LBA range used in one cache pool. Cache blocks are typically 4K or 16 K bytes in size. If multiple cache pools are used, the XOR operation could be performed on data no matter where it existed, as shown in FIG. 6. However, this makes the hardware that performs the XOR very complex and expensive.

It is believed that the multiple memory system support through segment assignment of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of increasing computer system bandwidth for computer system having two or more memory complexes, each complex having a cache pool, comprising:
   using exclusive OR (XOR) operations to generate a parity block from data from data regions,
   wherein no XOR operation is split between two or more cache pools.

2. The method of claim 1, further comprising a disk array controller determining the size of cache pool memory needed for storing the data from the data regions.

3. The method of claim 2, wherein the minimum size for storing the data is a disk sector size.

4. The method of claim 2, wherein the maximum size for storing the data is an entire volume.

5. The method of claim 1, wherein a disk array controller assigns the data regions to the single cache pool.

6. The method of claim 1, wherein the XOR operations on the data from the data regions to generate parity information.

7. The method of claim 6, wherein the parity information is stored in the same cache pool as the data regions.

8. The method of claim 1, wherein the data from the data regions is spread equally throughout the separate memory complexes.

9. The method of claim 1, wherein the method is used with a redundant array of independent disk drives.

10. The method of claim 2, wherein the size of the data from one of the separate memory complexes is a segment.

11. The method of claim 2, wherein the size of the data is a stripe.

12. The method of claim 11, wherein the stripe includes parity information generated from the data of the data regions.

13. The method of claim 1, wherein the exclusive or operation is performed through hardware.

14. The method of claim 1, further comprising first receiving the data from the data regions from outside the memory complexes.

15. The method of claim 1, wherein scaling the number of memory complexes does not affect the disk drive number.

16. The method of claim 1, wherein the data from the data regions is assigned to a single cache pool.

17. The method of claim 1, wherein the data comes from a host computer.

18. The method of claim 1, further comprising assigning logical block addresses to a specific cache pool.

19. The method of claim 18, wherein, if the data from the data regions spans two logical block address ranges, two XOR operations are performed.

20. A computer memory system, comprising:
   two or more separate memory complexes; and
   a memory controller, wherein the memory controller assigns data regions from a memory complex only to a single and corresponding cache memory pool.

21. The computer memory system of claim 20, further including a redundant array of independent disk drives.

22. The computer memory system of claim 21, wherein the memory controller assigns the data regions via firmware.

23. The computer memory system of claim 21, wherein the memory controller assigns the data regions via software computer code.

24. The computer memory system of claim 21, wherein the memory controller assigns the data regions via hardware.

25. The computer memory system of claim 21, wherein the data regions associated with a single one of the memory complexes are exclusive ored via hardware to form a parity block.

26. The computer memory system of claim 20, wherein each of the two or more separate memory complexes has its own associated memory controller.

27. The computer memory system of claim 26, wherein each of the two or more memory complexes and its own associated memory controller are part of a disk array controller.

28. The computer memory system of claim 20, further comprising mass storage devices.

29. The computer memory system of claim 28, wherein the mass storage devices include disk drives.

30. The computer memory system of claim 29, wherein the disk drives are arranged as a redundant array of independent disk drives.

* * * * *